US010200361B2

(12) United States Patent
Cai et al.

(10) Patent No.: US 10,200,361 B2
(45) Date of Patent: Feb. 5, 2019

(54) SYSTEM AND METHOD FOR INTEGRATING A TRANSACTIONAL MIDDLEWARE PLATFORM WITH A CENTRALIZED ACCESS MANAGER FOR SINGLE SIGN-ON IN AN ENTERPRISE-LEVEL COMPUTING ENVIRONMENT

(71) Applicant: Oracle International Corporation, Redwood Shores, CA (US)

(72) Inventors: Jimin (Jimmy) Cai, Beijing (CN); Lin Yang, Beijing (CN); Wei Li, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 255 days.

(21) Appl. No.: 15/193,949

(22) Filed: Jun. 27, 2016

(65) Prior Publication Data

US 2017/0289140 A1  Oct. 5, 2017

Related U.S. Application Data

(63) Continuation of application No. PCT/CN2016/078002, filed on Mar. 31, 2016.

(51) Int. Cl.
*G06F 21/00* (2013.01)
*H04L 29/06* (2006.01)
*H04L 29/08* (2006.01)

(52) U.S. Cl.
CPC ...... *H04L 63/0838* (2013.01); *H04L 63/0815* (2013.01); *H04L 63/10* (2013.01);
(Continued)

(58) Field of Classification Search
CPC ... G06F 21/566; G06F 21/56; G06F 2221/034
See application file for complete search history.

(56) References Cited

U.S. PATENT DOCUMENTS 7,627,853 B2  12/2009  Ibert
7,664,948 B2   2/2010  Moreau
(Continued)

FOREIGN PATENT DOCUMENTS

| CN | 101408955 | 4/2009 |
| CN | 103647794 | 3/2014 |
| WO | 2014046857 | 3/2014 |

OTHER PUBLICATIONS

State Intellectual Property Office of the P.R. China, International Searching Authority, International Search Report and Written Opinion dated Dec. 29, 2016 for International Application No. PCT/CN2016/077972, 13 Pages.

(Continued)

*Primary Examiner* — Morshed Mehedi
(74) *Attorney, Agent, or Firm* — Tucker Ellis LLP (57) ABSTRACT

In accordance with an embodiment, described is a system and method for integrating a transactional middleware platform with a centralized access manager to provide single sign-on authentication in an enterprise-level computing environment. The enterprise-level computing environment can include the transactional middleware platform and one or more SOA middleware platforms. Each middleware platform can include one or more access agents to access the centralized access manager configured to store user identity and security policy information for the enterprise-level computing environment. A request from a client for an application service in the transactional middleware platform can be intercepted by an access agent therein, which can communicate with a centralized access server of the centralized access manager to obtain a session token. The session token can be stored in an execution context of the client, for use in authorizing the client to access resources in each middleware platform in the enterprise-level computing environment.

16 Claims, 7 Drawing Sheets

(52) U.S. Cl.
CPC .............. *H04L 63/20* (2013.01); *H04L 67/02* (2013.01); *H04L 67/42* (2013.01)

(56) References Cited

U.S. PATENT DOCUMENTS

| | | |
|---|---|---|
| 7,886,281 B2 | 2/2011 | Smith |
| 8,010,783 B1* | 8/2011 | Cahill ................ H04L 63/10 713/155 |
| 8,423,973 B2 | 4/2013 | Saunders |
| 9,882,913 B1* | 1/2018 | Borowiec ........... H04L 63/102 |
| 2005/0044197 A1* | 2/2005 | Lai ..................... G06Q 10/10 709/223 |
| 2006/0021019 A1* | 1/2006 | Hinton ................ G06F 21/41 726/10 |
| 2007/0118878 A1 | 5/2007 | Sastry |
| 2007/0220598 A1* | 9/2007 | Salowey .............. H04L 9/0841 726/10 |
| 2009/0106433 A1* | 4/2009 | Knouse .............. H04L 63/0815 709/229 |
| 2012/0158821 A1* | 6/2012 | Barros ................ G06F 9/5055 709/203 |
| 2013/0191884 A1* | 7/2013 | Leicher ................ H04L 63/08 726/4 |
| 2014/0052548 A1* | 2/2014 | Dokken, Jr. ......... G06Q 50/01 705/14.73 |
| 2014/0189839 A1* | 7/2014 | Jezek ................ H04L 63/0815 726/8 |
| 2014/0282882 A1* | 9/2014 | Tsui ..................... H04L 63/08 726/4 |
| 2014/0282918 A1* | 9/2014 | Rothschild ......... H04L 63/0815 726/4 |
| 2015/0089614 A1 | 3/2015 | Mathew et al. |
| 2017/0187714 A1* | 6/2017 | Guo ................ H04L 63/0884 |

OTHER PUBLICATIONS

State Intellectual Property Office of the P.R. China (ISA/CN), International Search Report dated Jan. 4, 2017 for International Application No. PCT/CN2016/078002, 11 Pages.

* cited by examiner

SYSTEM AND METHOD FOR INTEGRATING A TRANSACTIONAL MIDDLEWARE PLATFORM WITH A CENTRALIZED ACCESS MANAGER FOR SINGLE SIGN-ON IN AN ENTERPRISE-LEVEL COMPUTING ENVIRONMENT

CLAIM OF PRIORITY

This application is a continuation of and claims the benefit of priority to International Application titled "SYSTEM AND METHOD FOR INTEGRATING A TRANSACTIONAL MIDDLEWARE PLATFORM WITH A CENTRALIZED ACCESS MANAGER FOR SINGLE SIGN-ON IN AN ENTERPRISE-LEVEL COMPUTING ENVIRONMENT", International Application No. PCT/CN2016/078002, filed Mar. 31, 2016, which application is herein incorporated by reference.

FIELD OF INVENTION

Embodiments of the invention are generally related to middleware platforms, and are particularly related to a system and method for integrating a transactional middleware platform into a centralized access manager for single sign-on authentication across multiple middleware platforms in an enterprise-level computing environment.

BACKGROUND

A transactional middleware platform, for example Oracle's Tuxedo, can interface with many other systems to manage distributed transactions, and therefore can include a plurality of security servers to support different types of authentication and authorization mechanisms. The different types of security servers can be hard to manage, and make it difficult to implement single sign-on authentication across multiple different types of middleware platforms in an enterprise-level computing environment.

SUMMARY

In accordance with an embodiment, described herein is a system and method for integrating a transactional middleware platform with a centralized access manager to provide single sign-on authentication in an enterprise-level computing environment. The enterprise-level computing environment can include the transactional middleware platform and one or more SOA middleware platforms. Each middleware platform can include one or more access agents to access the centralized access manager configured to store user identity and security policy information for the enterprise-level computing environment. A request from a client for an application service in the transactional middleware platform can be intercepted by an access agent therein, which can communicate with a centralized access server of the centralized access manager to obtain a session token. The session token can be stored in an execution context of the client, for use in authorizing the client to access resources in each middleware platform in the enterprise-level computing environment.

DETAILED DESCRIPTION

In today's corporate environment, a user often needs to access different resources in one sitting. These resources are often hosted on different types of middleware systems. For example, an employee may login to a human resource website to update his/her employee profiles, and subsequently the user may login to another website to check his/her expense reimbursement account.

Ideally, a single sign-on should be used in the above-described scenario, to avoid separate logins to each website. However, the two websites may be hosted on two different types of middleware platforms, which can make it difficult to implement a single sign-on solution.

For example, the human resource website can be hosted on a transactional middleware platform, for example, Oracle's Tuxedo platform; the website for expense reimbursements can be hosted on a service-oriented architecture (SOA) middleware platform, for example, Oracle's Fusion Middleware executing on a WebLogic server.

In accordance with an embodiment, described herein is a system and method for integrating a transactional middleware platform with a centralized access manager to provide single sign-on authentication in an enterprise-level computing environment. The enterprise-level computing environment can include the transactional middleware platform and one or more SOA middleware platforms. Each middleware platform can include one or more access agents to access the centralized access manager configured to store user identity and security policy information for the enterprise-level computing environment. A request from a client for an application service in the transactional middleware platform can be intercepted by an access agent therein, which can communicate with a centralized access server of the centralized access manager to obtain a session token. The session token can be stored in an execution context of the client, for use in authorizing the client to access resources in each middleware platform in the enterprise-level computing environment.

Middleware Platforms

Middleware platforms can provide a set of software modules that enable the construction, execution, and administration of high performance, distributed applications. A middleware platform can be a transaction-oriented system, for example, Oracle's Tuxedo system; or a service-oriented architecture (SOA) oriented system, for example, Oracle Fusion Middleware.

In accordance with an embodiment, applications targeted to a SOA-oriented middleware platform are typically standards-based web services, for example, Simple Object Access Protocol (SOAP) services or representational state transfer (REST) services. Each web service can be associated with a web service description language (WSDL) file, or a web application description language (WADL), that describes methods provided by the web service, and parameters required for accessing the web service.

Web services can be accessed by various web-based clients, including an application executing inside a web browser (for example, a Java Applet), a standalone Java application, another web service, or any program that accesses the web-bases services over a network connection using web protocols such as HTTP. A web service can communicate with another web-based client through XML messages.

In accordance with an embodiment, an application deployed to a transaction-oriented middleware platform or transactional middleware platform can comprise one or more client programs and one or more server programs. A client program of such an application can be developed, compiled and deployed as part of the application. For example, a client program can be compiled and linked with runtime libraries of the transactional middleware platform, for use in collecting input from a user, and sending requests to a server. A server program represents one or more application services that encapsulate business logic to process the input from a client.

In accordance with an embodiment, to be a client, a program needs to be able to invoke functions and procedures in a communication library (for example, Tuxedo's Application-to-Transaction-Monitor Interface, or ATMI) of the transactional middleware platform. A client can join an application by calling a client initialization routine in the communication library. Once a client joins an application, the client can define transaction boundaries and invoke functions in the communication library to communicate with application services in the application.

In accordance with an embodiment, before a client can send data to a server, the client needs to allocate a memory area/typed buffer (for example, a C structure or a COBOL record) from the runtime of a transactional middleware platform.

In accordance with an embodiment, a transactional middleware platform can include a shared memory (for example, Tuxedo's Bulletin Board) with information about clients and servers. A client can be a native client or a workstation client. A native client runs on a same machine wherein the shared memory exists, to directly access the shared memory to communicate with a server. A workstation client cannot access the shared memory, and needs to use TCP/IP sockets (for example, by executing a tpinit( ) call) to send messages to one or more server processes, which access the shared memory on behalf of the workstation client.

Application services in a transactional middleware platform can be exposed as web services to be accessible to web-based clients, using added-on products or extension interfaces to the transactional middleware platform.

For example, Oracle Service Architecture Leveraging Tuxedo (SALT) represents an added-on product that enables application services in a transactional middleware platform to participate in SOA environments. Java OnLine Transactions (JOLT) represents a Java-based interface that extends the functionality of existing application services to include Intranet- and Internet-wide availability.

In accordance with an embodiment, application services in a transactional middleware platform can also be made web accessible to web-based clients through a gateway (for example, WebLogic Tuxedo connector, or WTC) that bridges the two platforms.

Regardless which approach to use, events and activities associated with a particular service request across the different platforms can be correlated using an execution context identifier (ECID), which can be propagated with each request within a transactional middleware platform, and across different middleware platforms.

In accordance with an embodiment, a client needs to be authenticated to and authorized before the client can access protected resources in a transactional middleware platform.

In accordance with an embodiment, to manage distributed transaction processing, a transactional middleware platform can have a plurality of security servers to support different types of authentication and authorization mechanisms. For example, Tuxedo can provide security servers to support authentication based on a Unix password file and lightweight directory access protocol (LDAP), and authorization based on access control lists (ACL) and LDAP. The existence of the different types of security servers can be hard to manage, and make it difficult to implement a single sign-on authentication in a distributed computing environment.

In accordance with an embodiment, the following terms are used throughout this document:

Single Sign-On (SSO): In accordance with an embodiment, SSO refers to the ability that a user signs on to an application only once and gains access to many different application components, even though these components may have their own authentication schemes. SSO enables users to login securely to all their applications, web sites and mainframe sessions with just one identity.

Authentication: In accordance with an embodiment, authentication refers to the mechanism by which users prove their identity, and answers the question of who the users are, using credentials such as username/password combinations.

Authorization: In accordance with an embodiment, authorization refers to the process whereby the interactions between users and resources are controlled, based on user identity or other information. Authorization answers the question of what the users can access.

Security policies: In accordance with an embodiment, security policies answer the question of which user has access to a protected resource. A security policy can be created when an association between a resource and one or more users, groups, or security roles is defined. A resource has no protection until a security policy is assigned to it.

Centralized Access Manager

A centralized security manager, for example, Oracle Access Management (OAM) suite, can secure applications, data, web services, and cloud-based services. A centralized access manager can provide security functions and single sign-on services including identity context, authentication and authorization, policy administration, testing, logging, and auditing.

In accordance with an embodiment, a centralized access manager can provide a complete coverage of protocols to protect access over HTTP, REST, and SOAP channels; can support standards for authentication and user management, including OAuth, OpenID, and security assertion markup language (SAML); and can offer integration with on-premises, SaaS, cloud, and mobile applications, as well as social networking sites.

Figure 1:
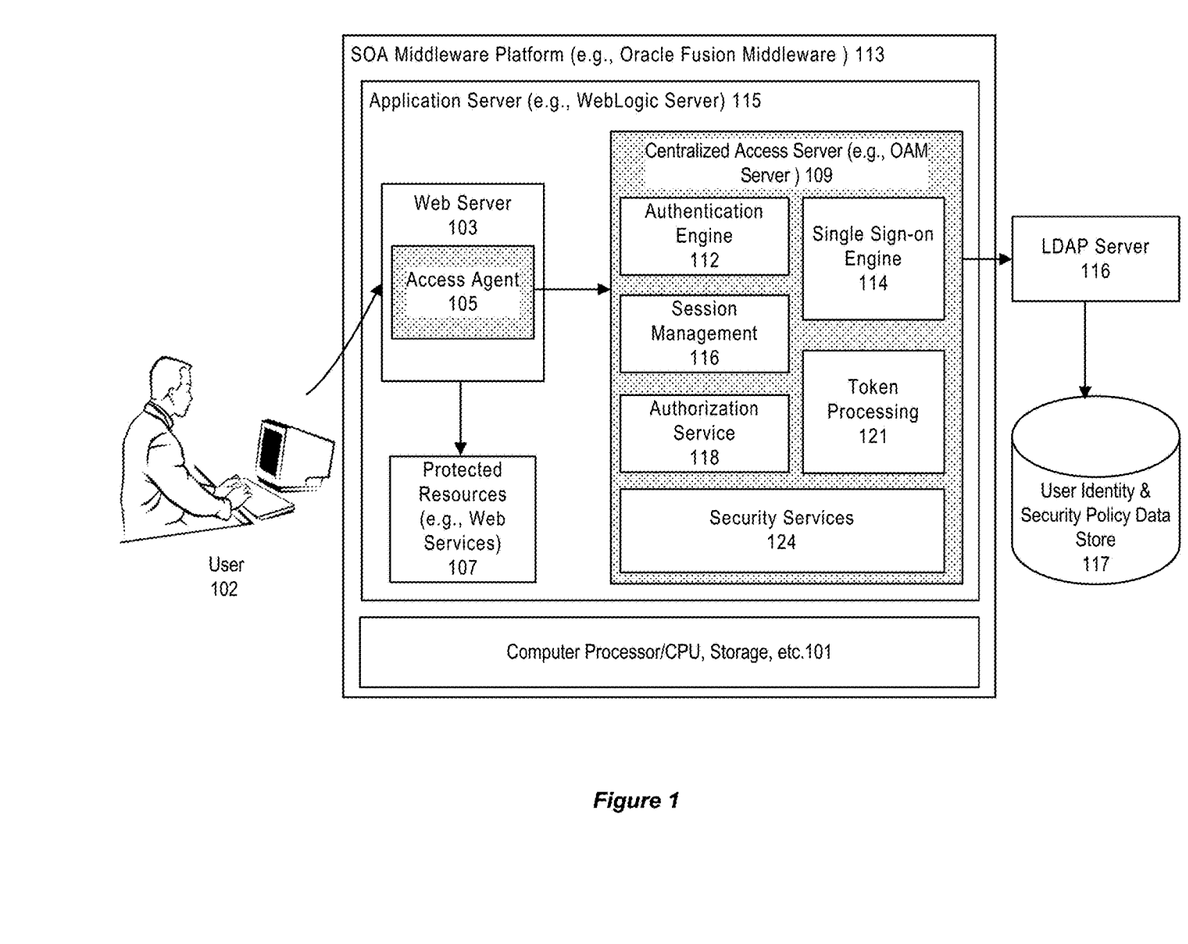
FIG. 1 illustrates a centralized access manager in accordance with an embodiment.

FIG. 1 illustrates a centralized access manager in accordance with an embodiment.

As shown in FIG. 1, a centralized access manager can include a centralized access server 109, and one or more access agents (for example, access agent) 105. The centralized access manager can reside on an instance of an application server (for example, Oracle's WebLogic server) 115 executing on one or more microprocessors 101 in a SOA middleware platform 113; and can include an authentication engine 112, an authorization service 118, a single sing-on engine 114, a session management module 116, and a token processing module 121. The services and engines work together with a plurality of security services 124 to provide SSO, authentication, and authorization to resources (for example, web services) 107 protected by the access agent registered with the centralized access manager.

In accordance with an embodiment, an access agent can be a front-ending entity that enables single sign-on across enterprise applications. The centralized access manager can provide a software development kit (SDK), for example, a pure Java SDK, and application programming interfaces (APIs) for creating custom access agents. A custom access agent can be registered with the centralized access manager to set up a required trust mechanism between the access agent and the centralized access server.

As shown in FIG. 1, the access agent can be part of a web server 103, and can delegate authentication and authorization tasks to the centralized access server. The centralized access server can use user identity and security policy data in a security data store 117 via a LDAP server 116 to authenticate and authorize client requests from a user 102.

In accordance with an embodiment, a security flow using the access manager can be descried as below:

When a request for a resource is received at an application, the access agent can construct a data structure, and use the data structure to communicate with the centralized access server for information indicating whether the requested resource is protected. If the resource is not protected, the access agent can grant or deny access to the resource. If the resource is protected, the access agent can construct another data structure for use in obtaining, from the centralized access server, information indicating what credentials the user needs to supply.

The application can use a form or another means to ask the user for user credentials. When the user responds to the application, the access agent can construct a data structure to present the user credentials to the centralized access server, which can map them to a user profile in the security data store. If the credentials prove valid, the access agent can create a session token for the user, and send a request for authorization to the centralized access server.

In accordance with an embodiment, the request can contain the session token, the user identity, the name of the target resource, and the requested operation. The access agent can grant the user access to the requested resource, providing that the user is authorized for the requested operation on the particular resource.

Integration with a Centralized Access Manager

In accordance with an embodiment, the system can integrate a transactional middleware platform with a centralized access manager to provide single sign-on authentication in an enterprise-level computing environment. The enterprise-level computing environment can include the transactional middleware platform and one or more SOA middleware platforms. Each middleware platform can include one or more access agents to access the centralized access manager configured to store user identity and security policy information for the enterprise-level computing environment. A request from a client for an application service in the transactional middleware platform can be intercepted by a custom access agent therein, which can communicate with a centralized access server of the centralized access manager to obtain a session token. The session token can be stored in an execution context of the client, for use in authorizing the client to access resources in each middleware platform in the enterprise-level computing environment In accordance with an embodiment, the user identity and security policy information can be stored in a data store of the centralized access manager. The security policy can include policies on services, queues and events. The custom access agent can include an authentication service and an authorization service, and can be registered with the centralized access manager.

In an accordance with an embodiment, when a client joins an application, a typed buffer (for example, a TPINIT buffer) passed to an initialization call (for example, tpinit( )) can be forwarded to the authentication service in the custom access agent. The custom access agent can start a session with the centralized access server, construct a user session object including user credentials, and use the user session object to communicate with centralized access server for authentication. The custom access agent can check response state information to determine whether the authentication has succeeded.

In accordance with an embodiment, if authentication is successful, a session token can be retrieved from the session, and placed in an execution context of the client. The session token can be automatically passed to server processes on subsequent calls from the client, and used by servers to authorize the client to execute services on the server processes.

In accordance with an embodiment, the session token can be passed in a typed buffer between different domains of the transactional middleware platform, to enable an already authorized client in a first domain to invoke a service in a second domain without being re-authenticated, and vice versa.

In accordance with an embodiment, SSO between the transactional middleware platform and web services of an external system (for example, a SOA middleware platform) can be supported.

In accordance with an embodiment, if a user accesses an application service in the transactional middleware platform through a web service gateway (for example, Oracle SALT), a session token can be set in an HTTP response, and any subsequent calls to external web services in the external system can carry the session token. An identity assertion security provider in the external system can use the session token to assert the identity of the user to achieve SSO. If a user accesses a web service first, a session token can also be set in an HTTP response. When the user accesses a resource in the transactional middleware platform afterwards, the web service gateway can retrieve the session token and use this token to assert the identity of the user.

Figure 2:
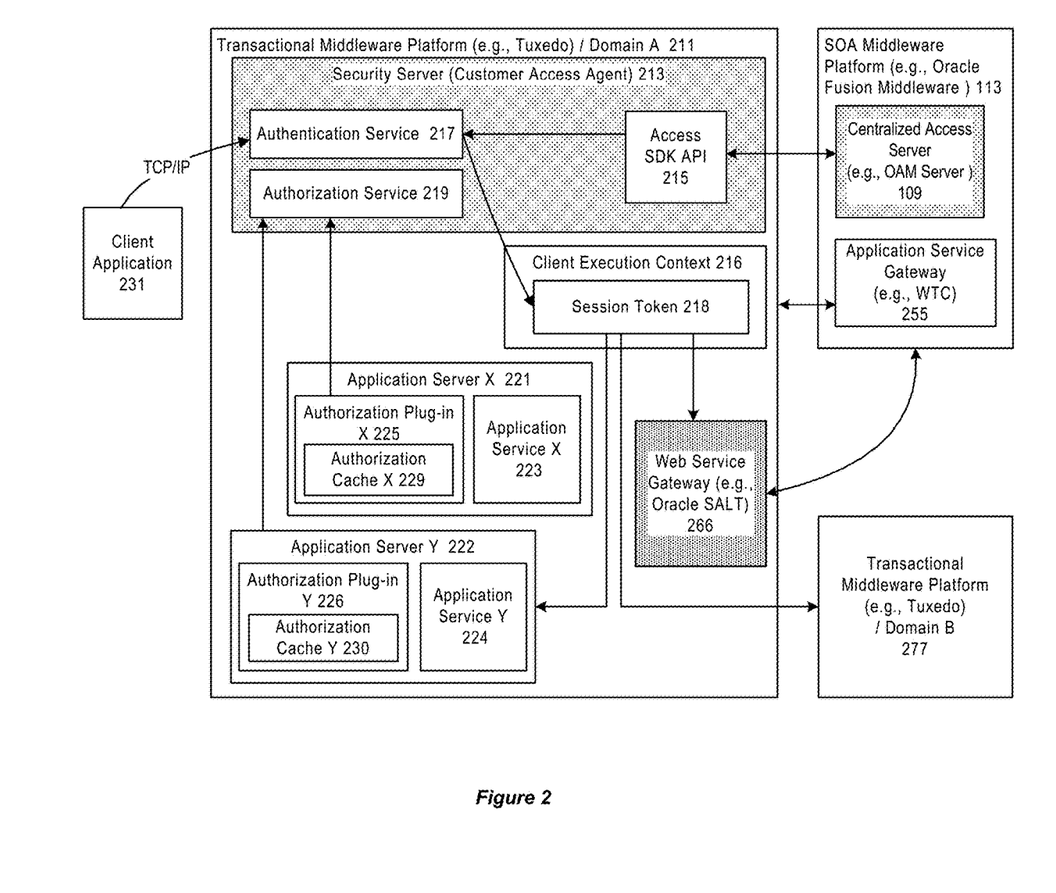
FIG. 2 illustrates a system for integrating a transactional middleware platform with a centralized access manager, in accordance with an embodiment.

FIG. 2 illustrates a system for integrating a transactional middleware platform with a centralized access manager, in accordance with an embodiment.

As shown in FIG. 2, a security server 213 can be provided in a domain (for example, domain A) 211 of a transactional middleware platform. The security server can include an authentication service 217 and an authorization service 219.

In accordance with an embodiment, the security server can be a custom access client developed using a software development kit (SDK) provided by the centralized access manager. The SDK can be used to provide a runtime environment for the security server.

As further shown in FIG. 2, the domain can include a plurality of application servers (for example, application server X 221, and application server Y 222). Each application server can be a Tuxedo server, and can host one or more application services, for example, application service X 223 and application service Y 224. Each application server can further include an authorization plug-in (for example, authorization plug-in X 225, or authorization plug-in Y 226). Each authorization plug-in can include an authorization cache (for example, authorization cache X 229, or authorization cache Y 230).

In accordance with an embodiment, when a client application 231 joins an application, a TPINIT buffer passed to tpinit( ) can be forwarded to the authentication service provided by the security server, which can construct an authentication structure including user credentials. The security server can pass the authentication request using an access SDK API 215 to the centralized access server to obtain a session token 218, and place the session token 218 in a client execution context 216.

In accordance with an embodiment, for resources with a security level set to ACL to MANDATORY_ACL, an operation from a user (for example, executing an application service, posting an event on an application queue) can trigger an authorization plug-in to check a local authorization cache configured to store authorized users, resources, and/or the session token.

If no cache entry is found, the authorization plug-in can invoke the authorization service, for example, using a field manipulation language (FML) buffer. The authorization service can use the session token to authorize the requested resource against the centralized access server.

In accordance with an embodiment, the client execution context can be a data structure that can include a user name, or application key, in addition to the session token.

Listing 1 illustrates an exemplary client execution context in accordance with an embodiment.

Listing 1

```
struct TUXC_ctx_t {
    ...
    long    _TUXC__sec_token_used; /* Used data in sec_token */
    unsigned char  *_TUXC_sec_oam_token; /* OAM session token */
    TM32U  _TUXC__sec_oam_token_size; /* Size of OAM token */
    TM32U  _TUXC__sec_atz_token_asize;
    /* Allocated OAM token size*/
    ...
};
```

In accordance with an embodiment, the session token can be passed between different transactional middleware platform domains, from example, from domain A to domain B 277, so that an already authorized client in domain A can invoke an application service in domain B without being re-authenticated, and vice versa. The session token can be passed together with a service request between domains in a data structure.

In an accordance with an embodiment, the session token can also be passed from the transactional middleware platform domain to the SOA middleware platform using a web service gateway (for example, Oracle SALT) 266, or an application service gateway (for example, WTC) 255 in the transactional middleware platform.

Session Token Passing Between Different Middleware Platforms

Figure 3:
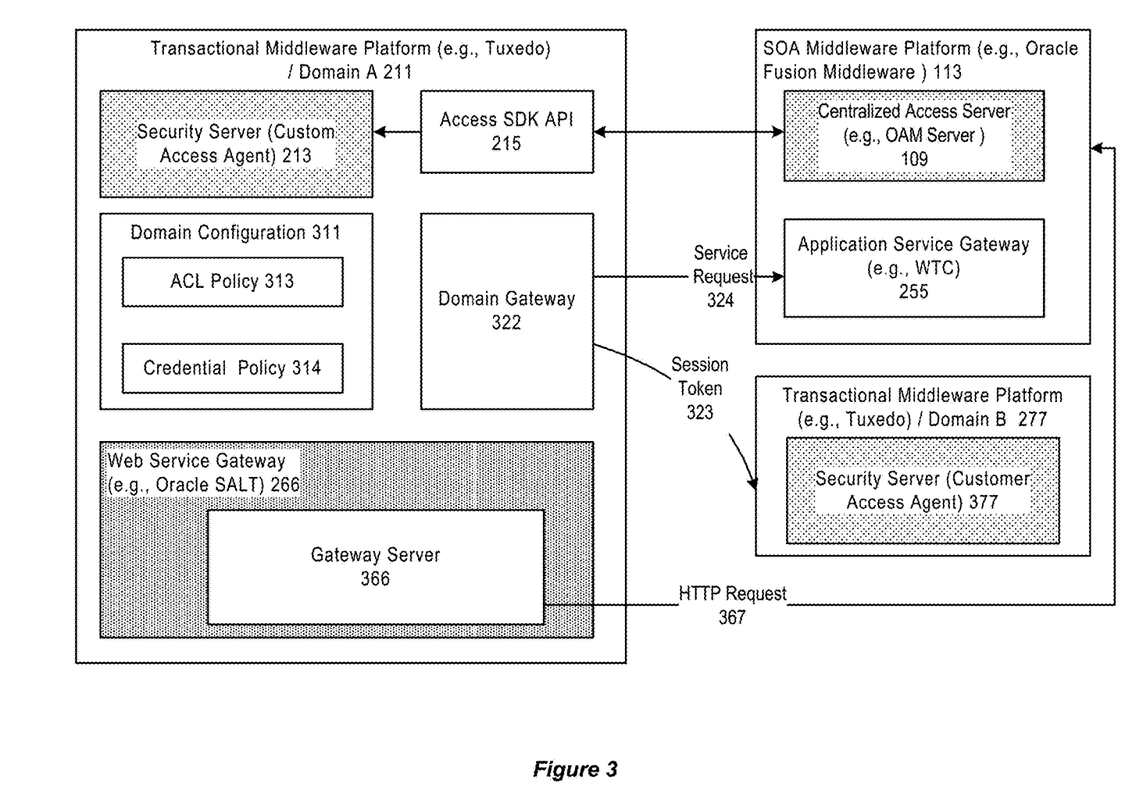
FIG. 3 further illustrates a system for integrating a transactional middleware platform with a centralized access manager, in accordance with an embodiment.

FIG. 3 further illustrates a system for integrating a transactional middleware platform with a centralized access manager, in accordance with an embodiment.

In accordance with an embodiment, an access control list (ACL) policy between applications executing in different transactional middleware platform domains can be set in a configuration file for a remote domain access point. The value for an access point of a particular remote domain can determine whether a local domain gateway can modify the identity of a service request received from the particular remote domain. If the ACL policy is set to LOCAL, the identity of service requests can be modified; and if the ACL policy is set to GLOBAL, the identity of the service requests can be passed into the local domain without change.

In accordance with an embodiment, a credential policy (e.g., CREDENTIAL_POLICY) can also be set to LOCAL or GLOBAL, where LOCAL indicates that a credential from a local service request destined for a remote domain access point is to be removed, and GLOBAL indicates that a credential from a local service request destined for a remote domain access point is not to be removed.

As shown in FIG. 3, both the ACL policy 313 and the credential policy 314 can be set to GLOBAL in a domain configuration file 311 of the transactional middleware platform domain A, so that a session token obtained from the centralized access server can be passed 323 from domain A to domain B.

In accordance with an embodiment, a similar configuration for the access client in each domain can be used to ensure the session token is valid in both domains. For example, the security server 213 in domain A and security server 377 in domain B can use a similar configuration.

In accordance with an embodiment, a session token can be passed in a service request 324 by a local domain gateway 322, from domain A to domain B, so that a user that has been authenticated in domain A does not need to be re-authenticated in domain B.

In accordance with an embodiment, a web service gateway (for example, Oracle SALT) can expose application services in the transactional middleware platform as web services.

As shown in FIG. 3, the web service gateway can include a gateway server 366 that can connect with web service applications via SOAP over HTTP/S protocol. The gateway server can act as a gateway process, and can be managed as an application server in the transactional middleware platform.

For example, the gateway server can accept SOAP requests from web service applications from the SOA middleware platform, and issue Tuxedo native calls to Tuxedo services, or accept Tuxedo ATMI requests and issues SOAP calls to the web service applications.

In accordance with an embodiment, for an outbound HTTP request (for example, HTTP request 367) from the web service gateway, the gateway server can set an existing session token in a header of the HTTP request. The SOA middleware platform can use the session token as identity assertion.

In accordance with an embodiment, the SOA middleware platform can use an application service gateway (for example, WebLogic Tuxedo Connector, or WTC) 255 to provide interoperability between web service applications and application services (for example, Tuxedo services).

In accordance with an embodiment, for an inbound service request from a client to the application service gateway, for example, service request 324, the client can be authenticated in the transactional middleware platform. The service request does not need to be re-authenticated after being received by the application service gateway. The application service gateway can directly invoke a target web service using a password, or a domain name.

In accordance with an embodiment, security modules in the SOA middleware platform can check the authorization of this principle (security identity). The target web service, for example, an enterprise Java Bean (EJB), can receive the identity without receiving any authentication data. The identity can be used for authorization checks.

Figure 4:
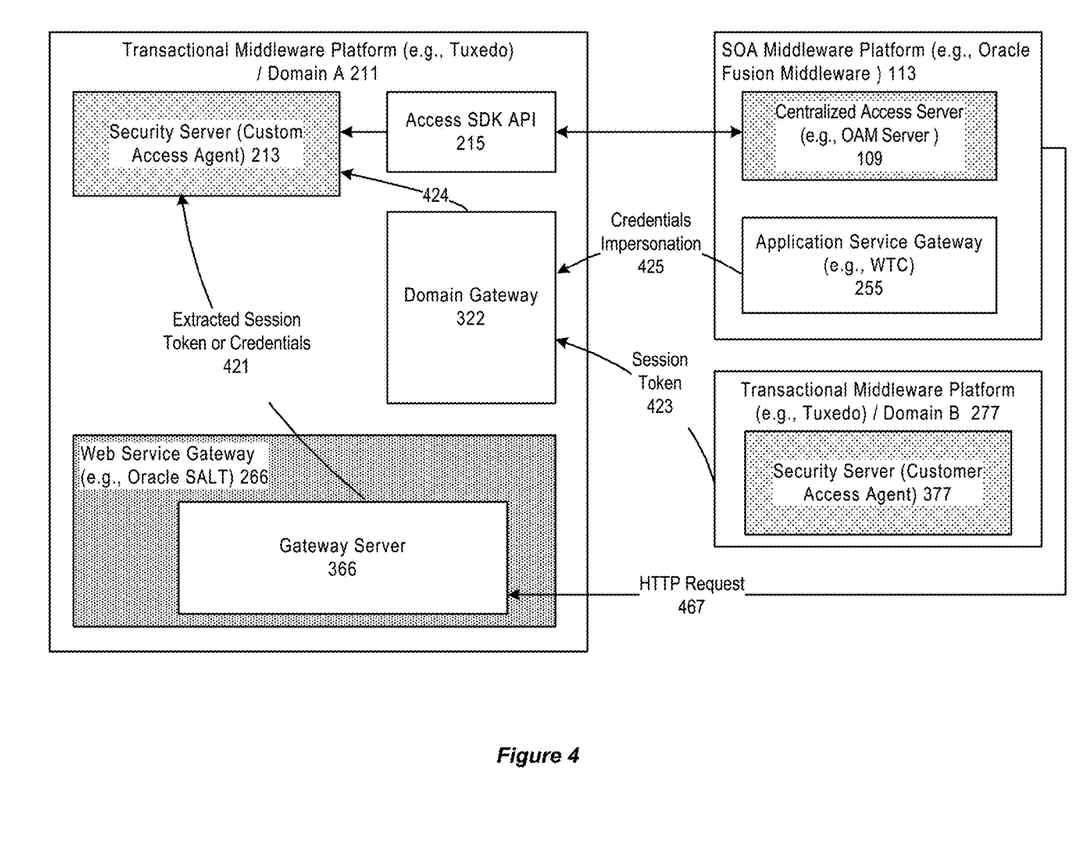
FIG. 4 further illustrates a system for integrating a transactional middleware platform with a centralized access manager, in accordance with an embodiment.

FIG. 4 further illustrates a system for integrating a transactional middleware platform with a centralized access manager, in accordance with an embodiment.

In accordance with an embodiment, if no session token exist in a service request received from domain B, the service request can be denied.

If a session token exists, as shown in FIG. 4, the session token 423 can be used to check the ACL. When receiving 424 the authorization request, the security server can use the session token to create a user session. If the session token is valid, the user session can be successfully created, and further authorization can be executed; otherwise the service request can be denied.

In accordance with an embodiment, when a domain gateway receives a request for a resource from a remote domain, if the ACL_POLICY for the resource is set to LOCAL, or the request does not contain a session token, the local domain gateway can replace the credential of the request with the principle name specified in the LOCAL_PRINCIPAL_NAME parameter. If the principal name is not specified, the principle name can default to the ACCESSPOINTID string for the remote domain access point. For this remote domain access point, a default password can also be provided.

In accordance with an embodiment, the default password and the specified principal name can be defined in the centralized access server.

In accordance with an embodiment, for an inbound HTTP request, for example, HTTP request 467, the gateway server can extract a user name and password from the request if an HTTP basic authentication is used for the HTTP request. The gateway server can use the extracted user name and password to call 421 the authentication service on the security server in the transactional middleware domain. The security server can obtain a session token using the steps as described above.

In accordance with an embodiment, if a user is already authenticated in the SOA middleware platform, and a session token exists in an HTTP header, the gateway server can extract the session token and use it for authorization.

In accordance with an embodiment, for an outbound service request from the application service gateway, an authentication check for a user associated with the request can be performed in the SOA middleware platform. Since no session token is passed to the transactional middleware platform (i.e. domain A), the local domain gateway can use the same approach as described above to impersonate 425 a desired principle (LOCAL_PRINCIPAL_NAME or ACCESSPOINTID and a remote domain password).

Figure 5:
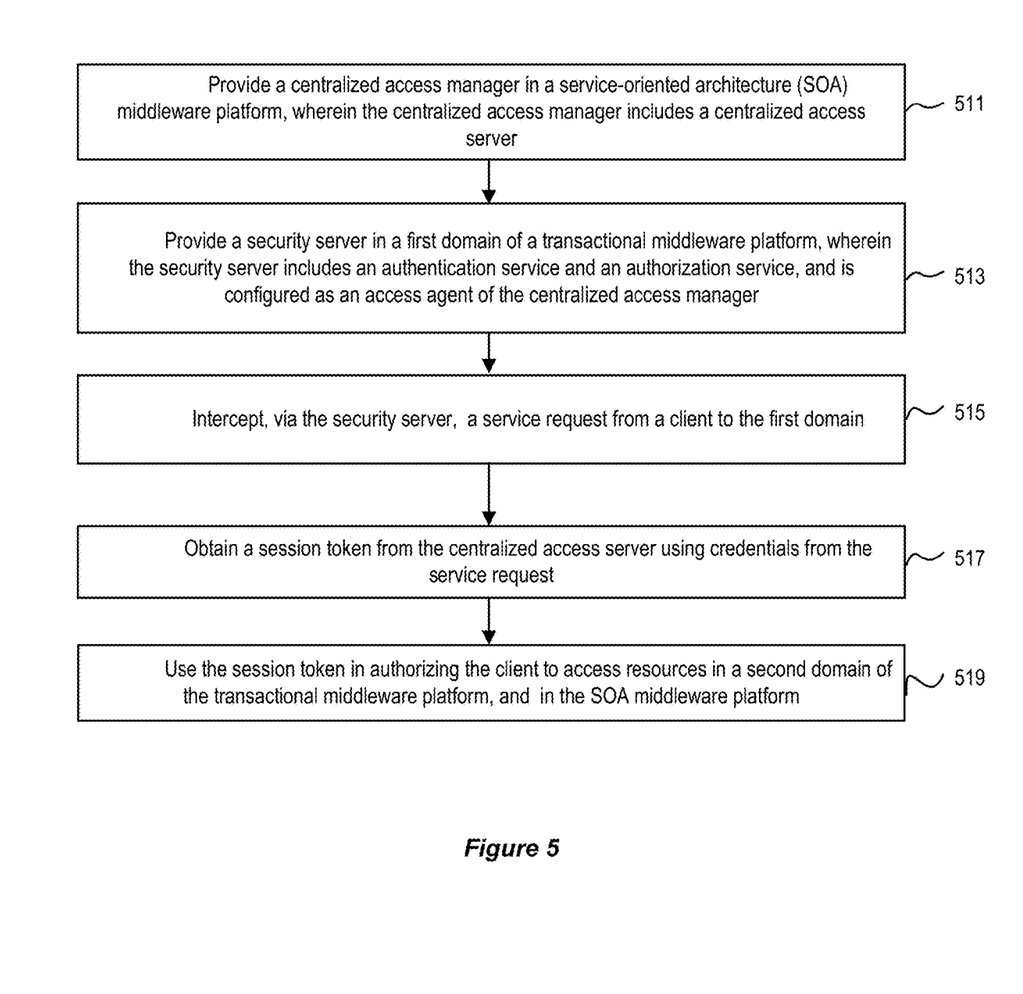
FIG. 5 illustrates a method for integrating a transactional middleware platform with a centralized access manager, in accordance with an embodiment.

FIG. 5 illustrates a method for integrating a transactional middleware platform with a centralized access manager, in accordance with an embodiment.

As shown in FIG. 5, at step 511, a centralized access manager can be provided in a service-oriented architecture (SOA) middleware platform, wherein the centralized access manager includes a centralized access server.

At step 513, a security server can be provided in a first domain of a transactional middleware platform, wherein the security server includes an authentication service and an authorization service, and is configured as an access agent of the centralized access manager.

At step 515, the security server can intercept a service request from a client to the first domain.

At step 517, the security server can obtain a session token from the centralized access server using credentials from the service request.

At step 519, the security server can use the session token to authorize the client to access resources in a second domain of the transactional middleware platform, and in the SOA middleware platform.

Figure 6:
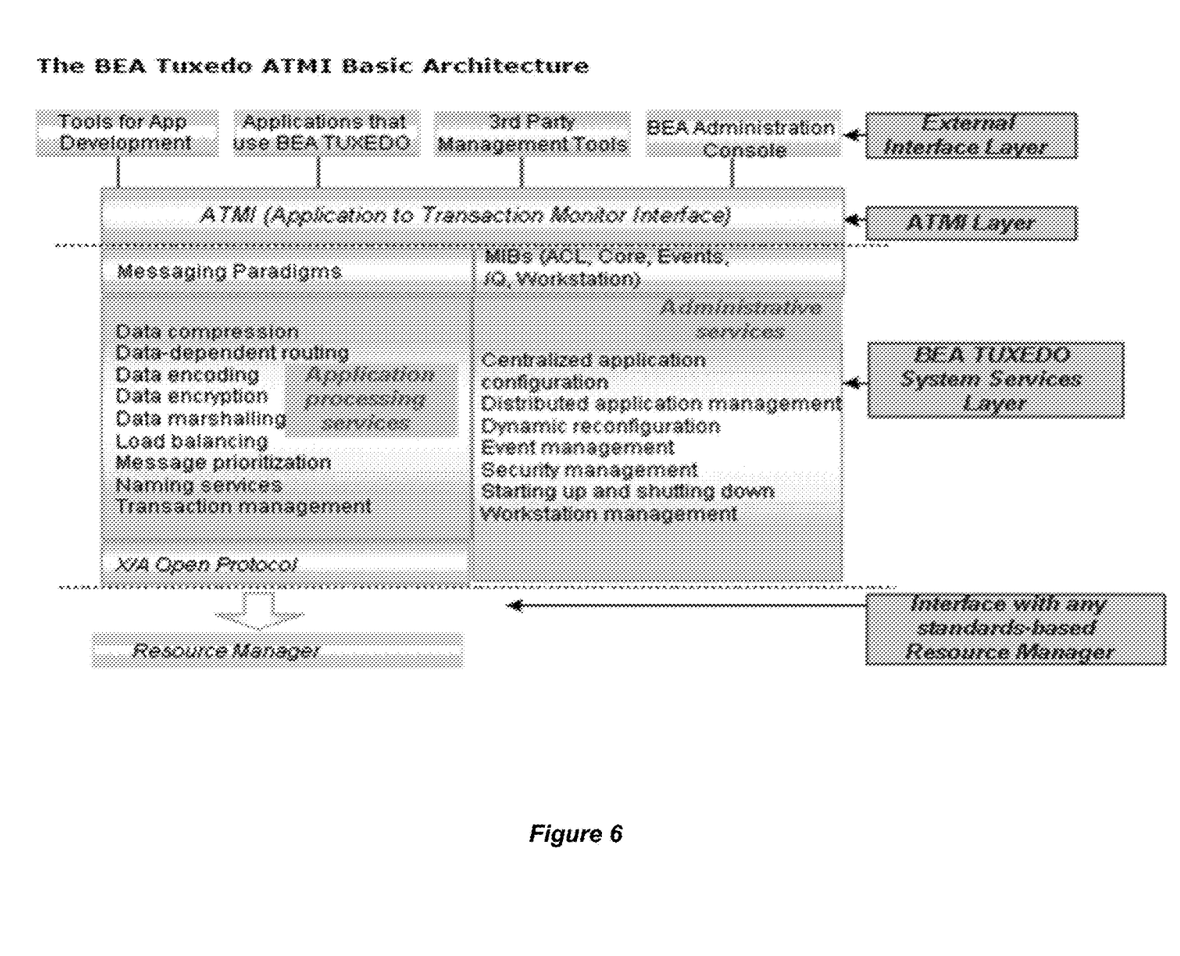
FIGS. 6-7 illustrates an exemplary transactional middleware platform, in accordance with an embodiment.
Figure 7:
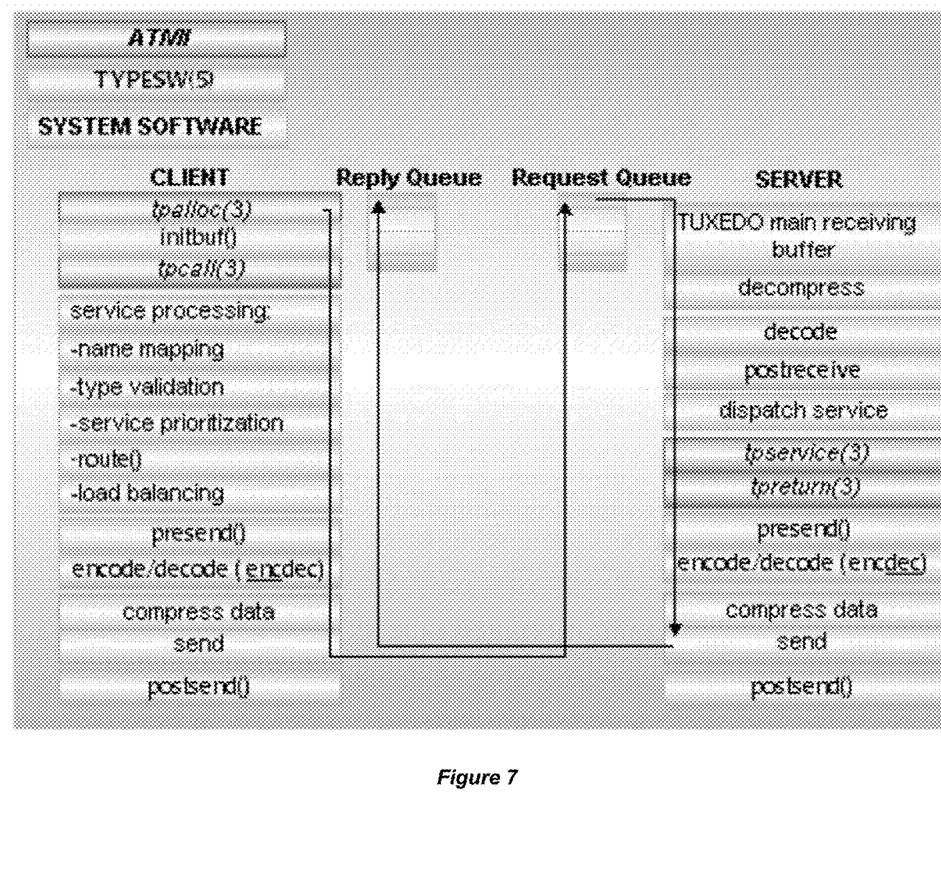

FIGS. 6-7 illustrate an exemplary transactional middleware platform, in accordance with an embodiment.

In accordance with an embodiment, Tuxedo (Transactions for UNIX, Enhanced for Distributed Operation) can be a transactional middleware platform described in various embodiments of the present invention.

Tuxedo represents a middleware product or system that can operate as an extension of an operation system (for example, UNIX). As a platform for execution and development, Tuxedo is designed for the creation and administration of e-commerce online transaction processing (OLTP) systems.

In accordance with an embodiment, the Tuxedo system shown in FIG. 6 can include an Application-to-Transaction Monitor Interface (ATMI) environment for use in communications, transactions, and management of data buffers.

As shown in FIG. 6, the ATMI environment can include an external interface layer 611, an ATMI layer 613, a system services layer 615, and a resource manager layer 617. The external interface layer can provide a plurality of interfaces between users and the ATMI environment. The ATMI layer can represent an interface between applications and the ATMI environment. The system services layer can provide services and/or capabilities for developing and administering applications.

In accordance with an embodiment, the Tuxedo system can use a message-based communications system to distribute applications across various operating system platforms and databases.

As shown in FIG. 7, communication within the ATMI environment can be accomplished by transferring messages. The Tuxedo system can pass service request messages between ATMI clients and servers through operating system (OS) inter-process communications (IPC) message queues. System messages and data can be passed between OS-supported, memory-based queues of clients and servers in buffers.

In accordance with an embodiment, messages in the ATMI environment can be packaged in typed buffers, which can represent buffers that contain both message data and data identifying the types of message data being sent.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combinations of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for integrating a transactional middleware platform with a centralized access manager, comprising:
   a centralized access manager in a service-oriented architecture (SOA) middleware platform, wherein the centralized access manager includes a centralized access server;
   a security server in a first domain of a transactional middleware platform, wherein the security server includes an authentication service and an authorization service, and is configured as an access agent of the centralized access manager;
   wherein the security server operates to intercept a service request from a client to the first domain, obtain a session token from the centralized access server using credentials from the service request, and use the session token to authorize the client in accessing resources in a second domain of the transactional middleware platform, and in the SOA middleware platform;
   wherein the first domain of the transactional middleware platform includes a plurality of application servers, wherein each application server includes an authorization plug-in and an authorization cache in the authorization plug-in; and
   wherein upon an application server receiving a service request, the authorization plug-in checks the associated authorization cache prior to invoking the authentication service on the security server.

2. The system of claim 1, wherein the session token is set in an execution context of the client, and is automatically passed to a plurality of server processes with subsequent service requests from the client.

3. The system of claim 1, wherein the authentication service on the security server constructs an authentication structure including user credentials, and passes the authentication request to the centralized access server using an access application programming interface (API) exposed by a software development kit (SDK).

4. The system of claim 1, wherein the first domain receives a session token from the second domain, and uses the received session token to authorize the request against the centralized access server.

5. The system of claim 1, wherein the first domain receives a HTTP request via a web service gateway, and extracts a user name and password from the request, and uses the extracted credentials to obtain a session token from the centralized access server.

6. The system of claim 1, wherein the transactional middleware platform uses a message-based communications system to distribute applications across a plurality of different types of operating system platforms and databases.

7. The system of claim 1, wherein the transactional middleware platform includes an Application-to-Transaction Monitor Interface (ATMI) environment for transferring messages between one or more client programs and one or more server programs.

8. A method for integrating a transactional middleware platform with a centralized access manager, comprising:
   providing a centralized access manager in a service-oriented architecture (SOA) middleware platform, wherein the centralized access manager includes a centralized access server;
   providing a security server in a first domain of a transactional middleware platform, wherein the security server includes an authentication service and an authorization service, and is configured to be an access agent of the centralized access manager;
   intercepting, via the security server, a service request from a client to the first domain;
   obtaining a session token from the centralized access server using credentials from the service request; and
   using the session token in authorizing the client to access resources in a second domain of the transactional middleware platform, and in the SOA middleware platform:
   wherein the first domain of the transactional middleware platform includes a plurality of application servers, wherein each application server includes an authorization plug-in and an authorization cache in the authorization plug-in; and
   wherein upon an application server receiving a service request, the authorization plug-in checks the associated authorization cache prior to invoking the authentication service on the security server.

9. The method of claim 8, wherein the session token is set in an execution context of the client, and is automatically passed to a plurality of server processes with subsequent service requests from the client.

10. The method of claim 8, wherein the authentication service on the security server constructs an authentication structure including user credentials, and passes the authentication request to the centralized access server using an access application programming interface (API) exposed by a software development kit (SDK).

11. The method of claim 8, wherein the first domain receives a session token from the second domain, and uses the received session token to authorize the request against the centralized access server.

12. The method of claim 8, wherein the first domain receives a HTTP request via a web service gateway, and extracts a user name and password from the request, and uses the extracted credentials to obtain a session token from the centralized access server.

13. The method of claim 8, wherein the transactional middleware platform uses a message-based communications system to distribute applications across a plurality of different types of operating system platforms and databases.

14. The method of claim 8, wherein the transactional middleware platform includes an Application-to-Transaction Monitor Interface (ATMI) environment for transferring messages between one or more client programs and one or more server programs.

15. A non-transitory computer-readable storage medium storing a set of instructions for integrating a transactional middleware platform with a centralized access manager, said instructions, when executed by one or more processors, causing the one or more processors to perform steps comprising:

providing a centralized access manager in a service-oriented architecture (SOA) middleware platform, wherein the centralized access manager includes a centralized access server;

providing a security server in a first domain of a transactional middleware platform, wherein the security server includes an authentication service and an authorization service, and is configured to be an access agent of the centralized access manager;

intercepting, via the security server, a service request from a client to the first domain;

obtaining a session token from the centralized access server using credentials from the service request; and using the session token in authorizing the client to access resources in a second domain of the transactional middleware platform, and in the SOA middleware platform wherein the first domain of the transactional middleware platform includes a plurality of application servers, wherein each application server includes an authorization plug-in and an authorization cache in the authorization plug-in; and wherein upon an application server receiving a service request, the authorization plug-in checks the associated authorization cache prior to invoking the authentication service on the security server.

16. The non-transitory computer-readable storage medium of claim 15, wherein the session token is set in an execution context of the client, and is automatically passed to a plurality of server processes with subsequent service requests from the client.

\* \* \* \* \*

UNITED STATES PATENT AND TRADEMARK OFFICE
CERTIFICATE OF CORRECTION

PATENT NO.       : 10,200,361 B2
APPLICATION NO.  : 15/193949
DATED            : February 5, 2019
INVENTOR(S)      : Cai et al.

Page 1 of 1

It is certified that error appears in the above-identified patent and that said Letters Patent is hereby corrected as shown below:

In the Specification

Column 1, Line 20, Below "reference." insert -- COPYRIGHT NOTICE
A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. --.

Column 5, Line 3, delete "sing-on" and insert -- sign-on --, therefor.

Column 6, Line 2, after "environment" insert -- . --.

Signed and Sealed this
Twenty-eighth Day of January, 2020

Andrei Iancu
*Director of the United States Patent and Trademark Office*